United States Patent
Araki (10) Patent No.: US 9,465,188 B2
(45) Date of Patent: Oct. 11, 2016

(54) LENS BARREL

(71) Applicant: Panasonic Corporation, Osaka (JP)

(72) Inventor: Yoshiharu Araki, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 443 days.

(21) Appl. No.: 13/940,473

(22) Filed: Jul. 12, 2013

(65) Prior Publication Data

US 2014/0022656 A1 Jan. 23, 2014

(30) Foreign Application Priority Data

Jul. 17, 2012 (JP) .................................. 2012-158966
Jun. 6, 2013 (JP) .................................. 2013-120195

(51) Int. Cl.
*G02B 7/02* (2006.01)
*G02B 15/14* (2006.01)
*G02B 7/04* (2006.01)
*G02B 7/10* (2006.01)
*G02B 7/08* (2006.01)

(52) U.S. Cl.
CPC . *G02B 7/04* (2013.01); *G02B 7/08* (2013.01); *G02B 7/10* (2013.01); *G02B 7/102* (2013.01)

(58) Field of Classification Search
CPC ............ G02B 7/02; G02B 7/04; G02B 7/10; G02B 7/102
USPC .......................................... 359/700, 826, 827
See application file for complete search history.

(56) References Cited

U.S. PATENT DOCUMENTS 5,144,493 A * 9/1992 Nomura ......................... 359/700
6,263,163 B1 7/2001 Sasaki et al.

FOREIGN PATENT DOCUMENTS

| | | |
|---|---|---|
| JP | 7-191251 | 7/1995 |
| JP | 2001-13397 | 1/2001 |
| JP | 2007-47542 | 2/2007 |

* cited by examiner

*Primary Examiner* — William Choi
(74) *Attorney, Agent, or Firm* — Panasonic Patent Center (57) ABSTRACT

A lens barrel includes a flexible printed circuit board, a moving unit, and a support frame. The moving unit is configured to support the flexible printed circuit board. The support frame is configured to allow the moving unit to move in an optical axis direction. The support frame is configured to house the moving unit. The support frame includes a guide groove for guiding the flexible printed circuit board. The moving unit includes a convex portion provided to its outer peripheral portion. At least part of the convex portion is disposed in the guide groove.

8 Claims, 9 Drawing Sheets

LENS BARREL

CROSS-REFERENCE TO RELATED APPLICATIONS

This application claims priority under 35 U.S.C. §119 to Japanese Patent Application No. 2012-158966, filed on Jul. 17, 2012 and No. 2013-120195, filed on Jun. 6, 2013. The entire disclosure of Japanese Patent Application No. 2012-158966 and No. 2013-120195 is hereby incorporated herein by reference.

TECHNICAL FIELD

The technology disclosed herein relates to a lens barrel.

BACKGROUND INFORMATION

Japanese Laid-Open Patent Application H7-191251 discloses a mounting structure for a flexible printed circuit board of a lens barrel. With this flexible printed circuit board mounting structure, the flexible printed circuit board is housed in a board housing concave portion formed in the inner peripheral face of a fixed lens barrel. In this state, the flexible printed circuit board is pressed by a light shielding ring 81 disposed between a movable lens barrel and a fixed lens barrel (the board housing concave portion).

SUMMARY

This disclosure provides a lens barrel with which a flexible printed circuit board can be easily mounted to a support frame.

A lens barrel disclosed herein comprises a flexible printed circuit board, a moving unit, and a support frame. The moving unit is configured to support the flexible printed circuit board. The support frame is configured to allow the moving unit to move in an optical axis direction. The support frame is configured to house the moving unit. The support frame includes a guide groove for guiding the flexible printed circuit board. The moving unit includes a convex portion provided to its outer peripheral portion. At least part of the convex portion is disposed in the guide groove.

With the lens barrel disclosed herein, a flexible printed circuit board can be easily mounted to a support frame.

BRIEF DESCRIPTION OF THE DRAWINGS

Referring now to the attached drawings, which form a part of this original disclosure.

DETAILED DESCRIPTION OF EMBODIMENTS

An embodiment will now be described in detail through reference to the drawings. Unnecessarily detailed description may be omitted in some cases. For instance, detailed description of facts that are already well known, or redundant descriptions of components that are substantially the same may be omitted. This is to keep the following description from being needlessly repetitious, and to facilitate an understanding on the part of a person skilled in the art.

Furthermore, the inventors have provided the appended drawings and the following description so that a person skilled in the art will be able to fully understand this disclosure, and do not intend by this to limit the main topic of the claims.

Embodiment

This embodiment will now be described through reference to the drawings. In the following discussion of the drawings, those portions that are the same or similar are given the same or similar numbering. The drawings, however, are merely illustrative in nature, and the various dimensional ratios and so forth may differ from those in actuality. Therefore, specific dimensions and so forth should be determined by referring to the following description. Also, the dimensional relations and ratios may of course vary from one drawing to the next.

In the following embodiment, a digital camera will be described as an example of an imaging device. In the following description, assuming that the digital camera is in its landscape orientation, the subject side of the camera body 1 will be referred to as the "front," the opposite side from the subject as the "rear," vertically upward as "upward," vertically downward as "downward," the right side when facing the subject as "right," and the left side when facing the subject as "left." "Landscape orientation" is a kind orientation of a digital camera, and when an image is captured in landscape orientation, the long-side direction of a rectangular image that is wider than it is tall substantially coincides with the horizontal direction within the image.

1-1. Overall Configuration

Figure 1:
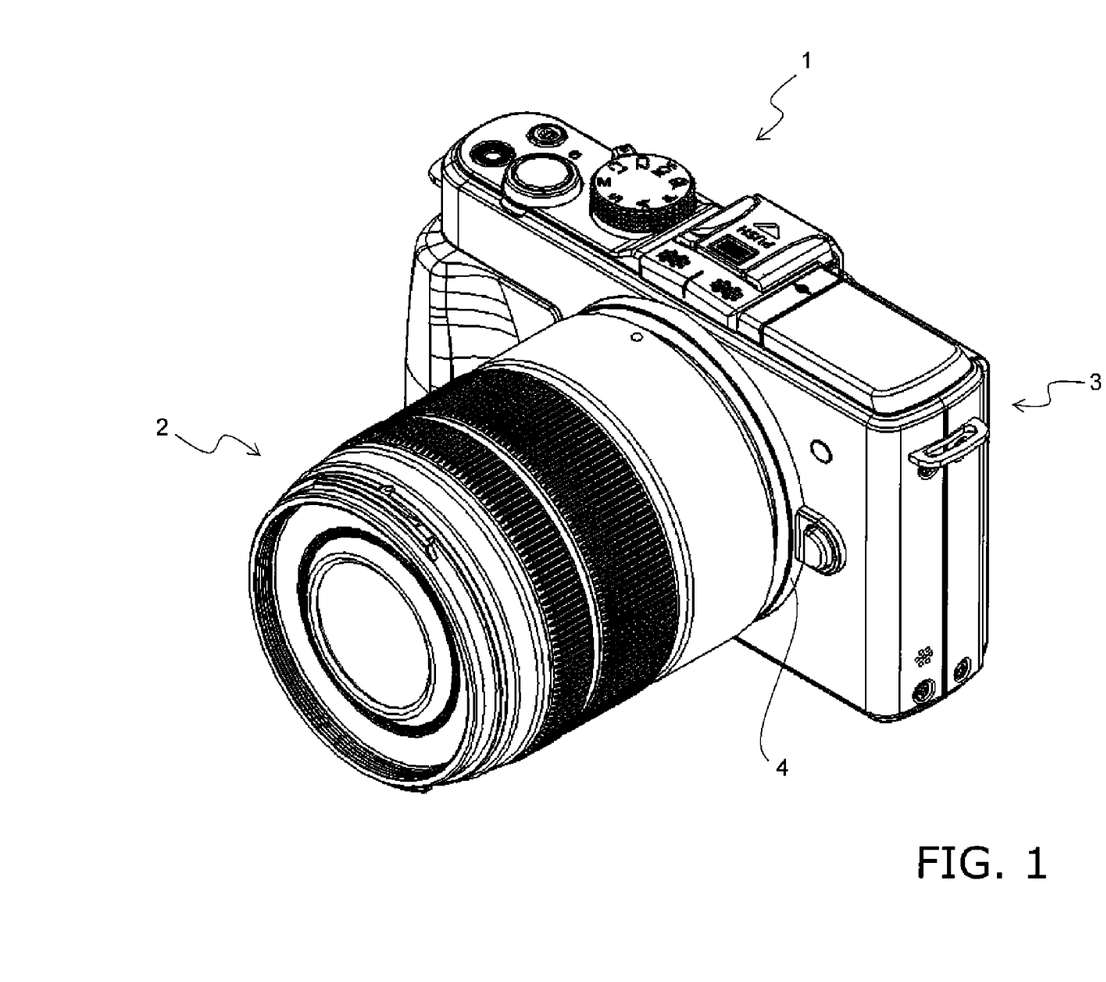
FIG. 1 is an external oblique view of a digital camera pertaining to an embodiment.

A digital camera 1 is a type that uses an interchangeable lens. As shown in FIG. 1, the digital camera 1 mainly comprises a camera body 3 and a lens barrel 2. The lens barrel 2 is removably mounted to the camera body 3. More precisely, the lens barrel 2 is removably mounted to the camera body 3 by mechanically and electrically connecting a lens mount 5 (see FIG. 3) of the lens barrel 2 to a body mount 4 of the camera body 3.

Figure 2:
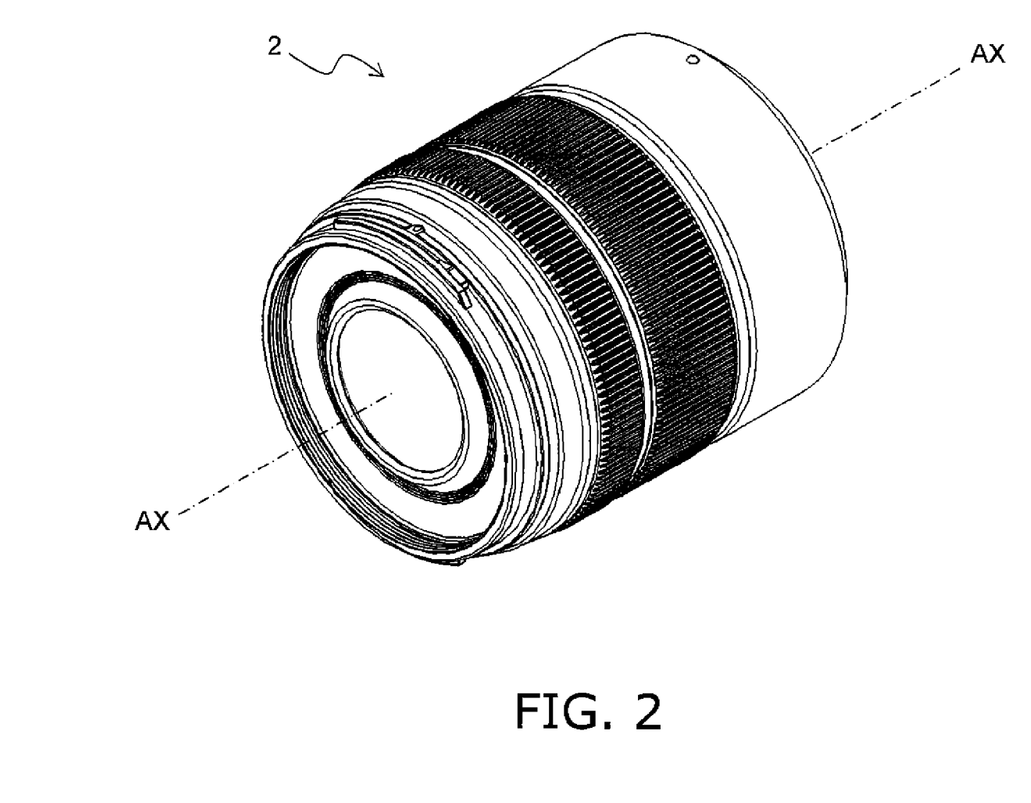
FIG. 2 is an external oblique view of the lens barrel pertaining to this embodiment.

As shown in FIG. 2, the lens barrel 2 is a cylindrical body that supports a lens. FIG. 2 shows an optical axis AX as the optical axis of the lens. The optical axis direction is a direction that follows along the optical axis AX, and is also a direction that is parallel to the optical axis AX.

Figure 3:
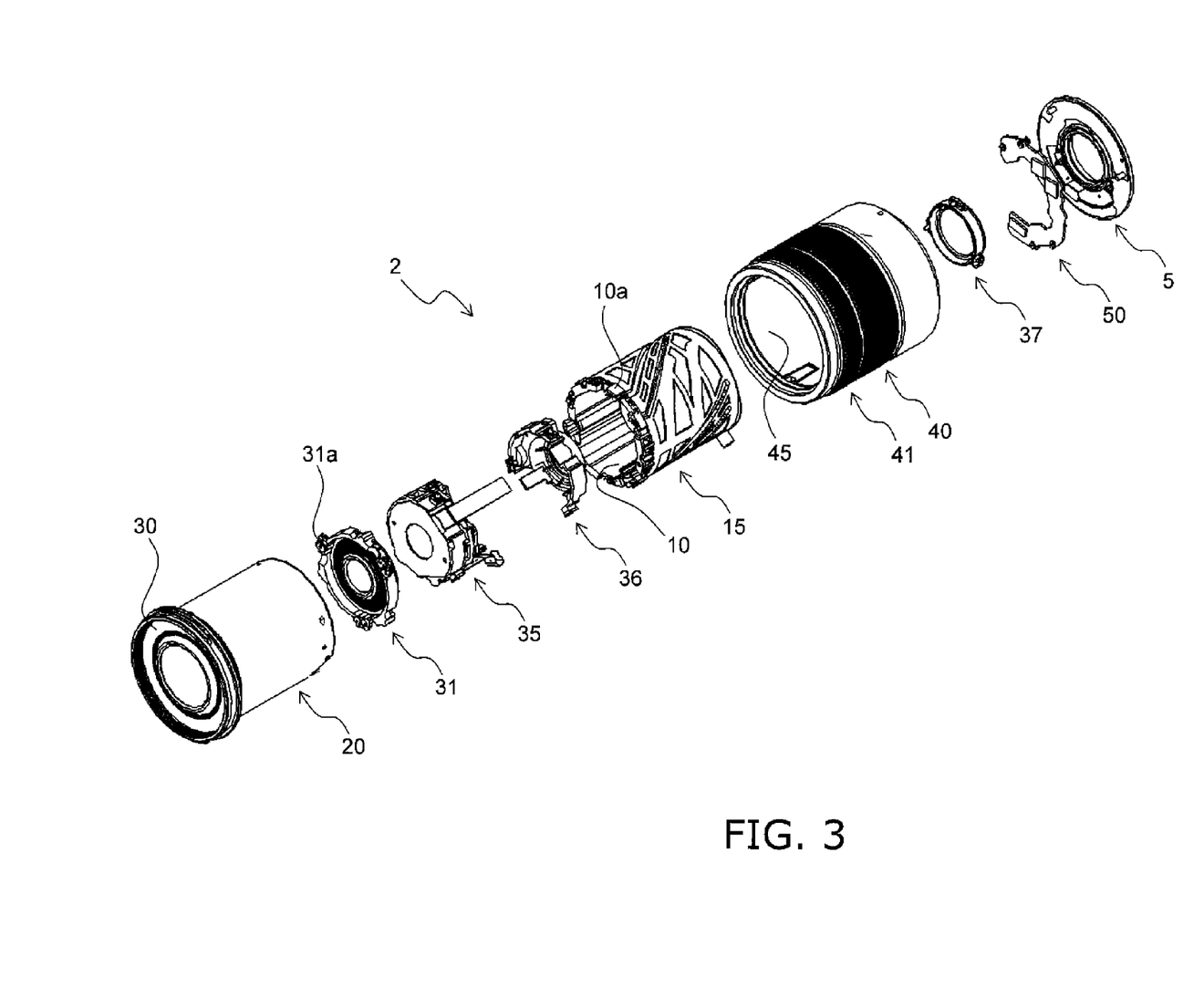
FIG. 3 is an exploded oblique view of the lens barrel pertaining to this embodiment.
Figure 4:
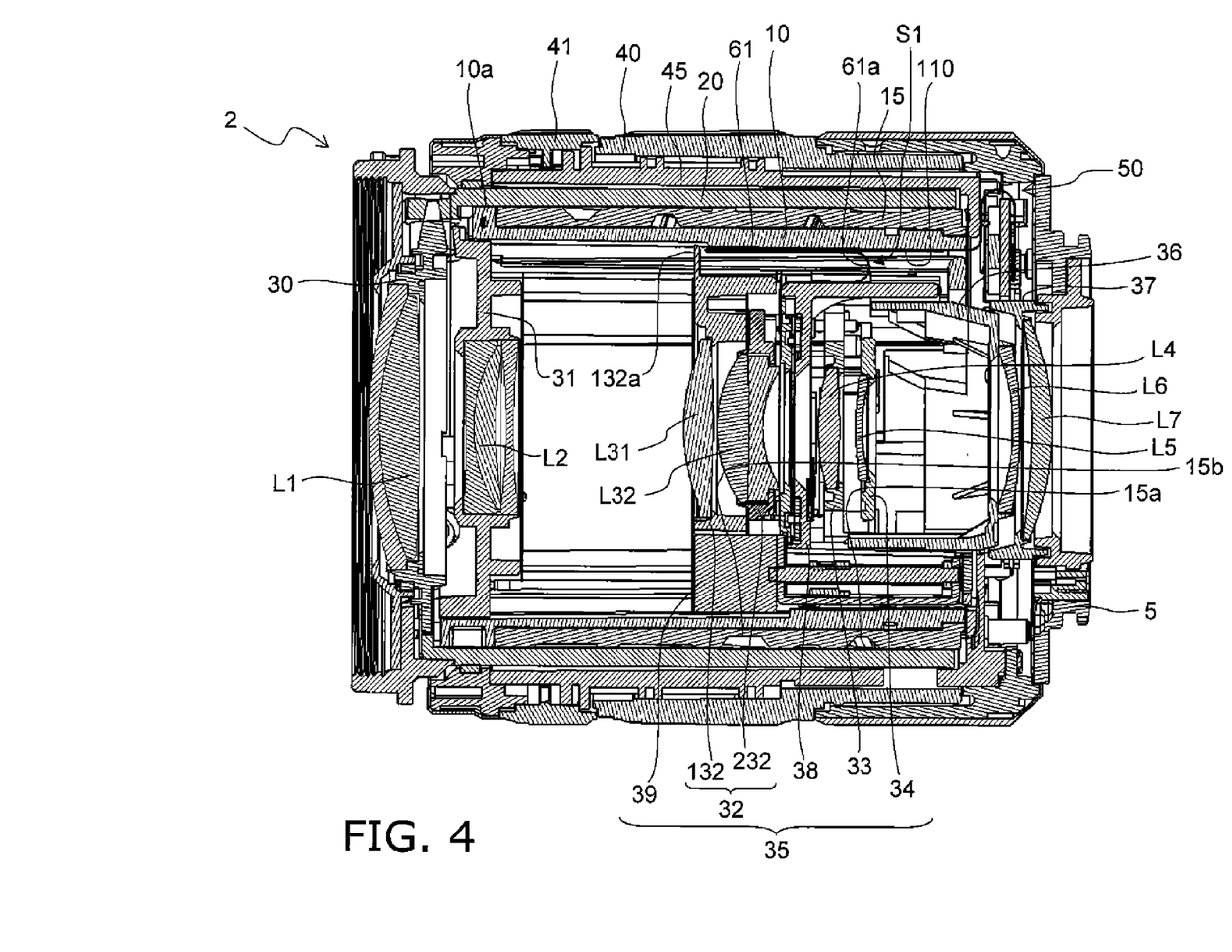
FIG. 4 is a cross section (wide-angle state) of the lens barrel pertaining to this embodiment.
Figure 5:
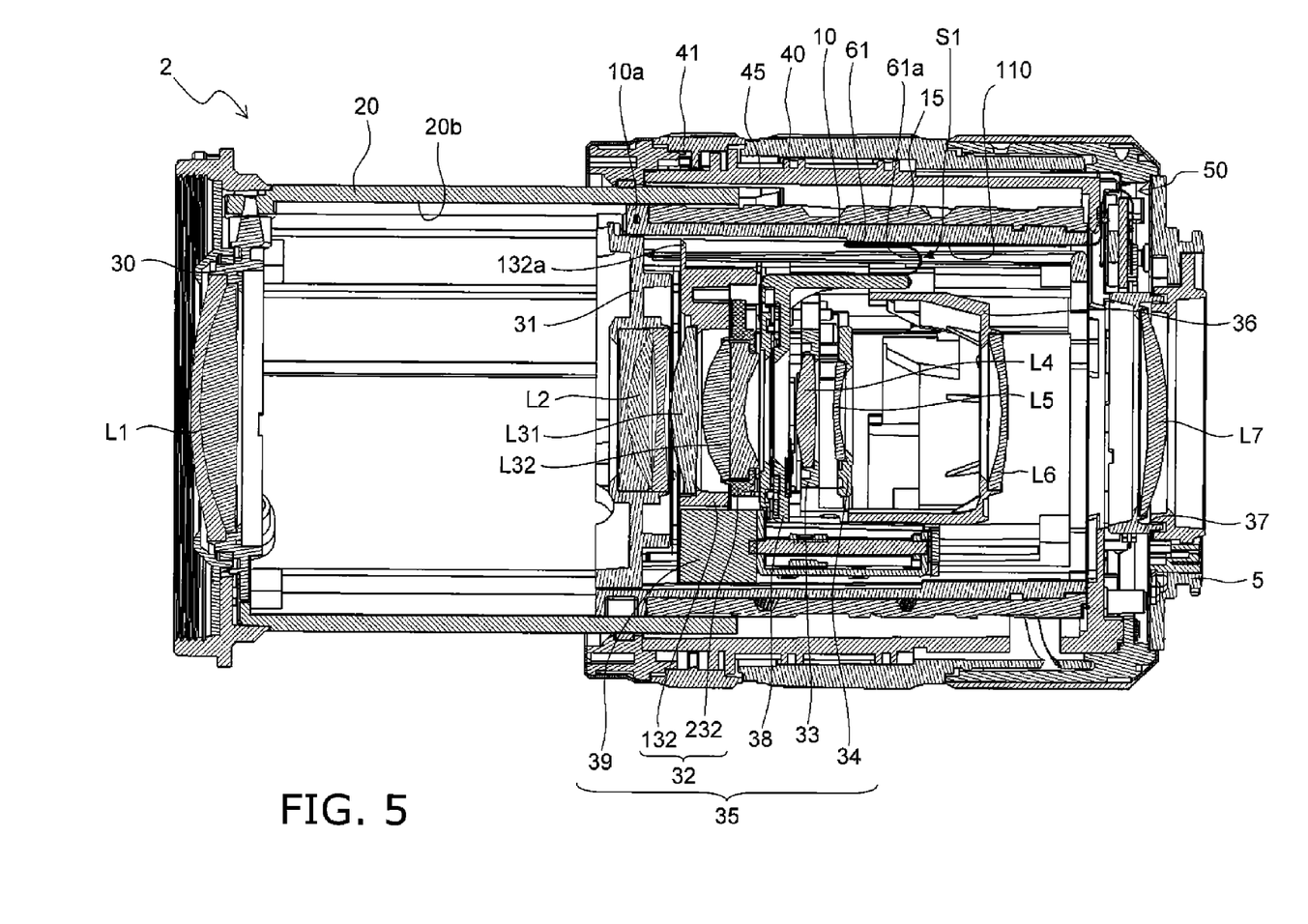
FIG. 5 is a cross section (telephoto state) of the lens barrel pertaining to this embodiment.

As shown in FIGS. 3 to 5, the lens barrel 2 includes a rectilinear fixing frame 10 and a cam frame 15. The lens barrel 2 further includes a first lens holder 20 that supports a first lens frame 30, as well as a second lens frame 31, a lens frame assembly 35, a sixth lens frame 36, and a seventh lens frame 37. The lens barrel 2 further includes a zoom ring 40, a focus ring 41, and a ring mount base 45. The lens barrel 2 also includes a board 50 used for lens control.

The rectilinear fixing frame 10 is formed in a cylindrical shape. The rectilinear fixing frame 10 supports a plurality of frames. These frames are disposed on the rectilinear fixing frame 10. The frames include the sixth lens frame 36, the lens frame assembly 35, and the second lens frame 31. As shown in FIG. 3, the sixth lens frame 36 and the lens frame assembly 35 are inserted into the rectilinear fixing frame 10 from the front side in the optical axis direction (an example of the "one side in the optical axis direction") toward the rear side in the optical axis direction (an example of the "other side in the optical axis direction"). Consequently, the sixth lens frame 36 and the lens frame assembly 35 are unable to rotate but able to move back and forth in the optical axis direction with respect to the rectilinear fixing frame 10. The second lens frame 31 is mounted to the rectilinear fixing frame 10 on the front side in the optical axis direction.

Figure 6:
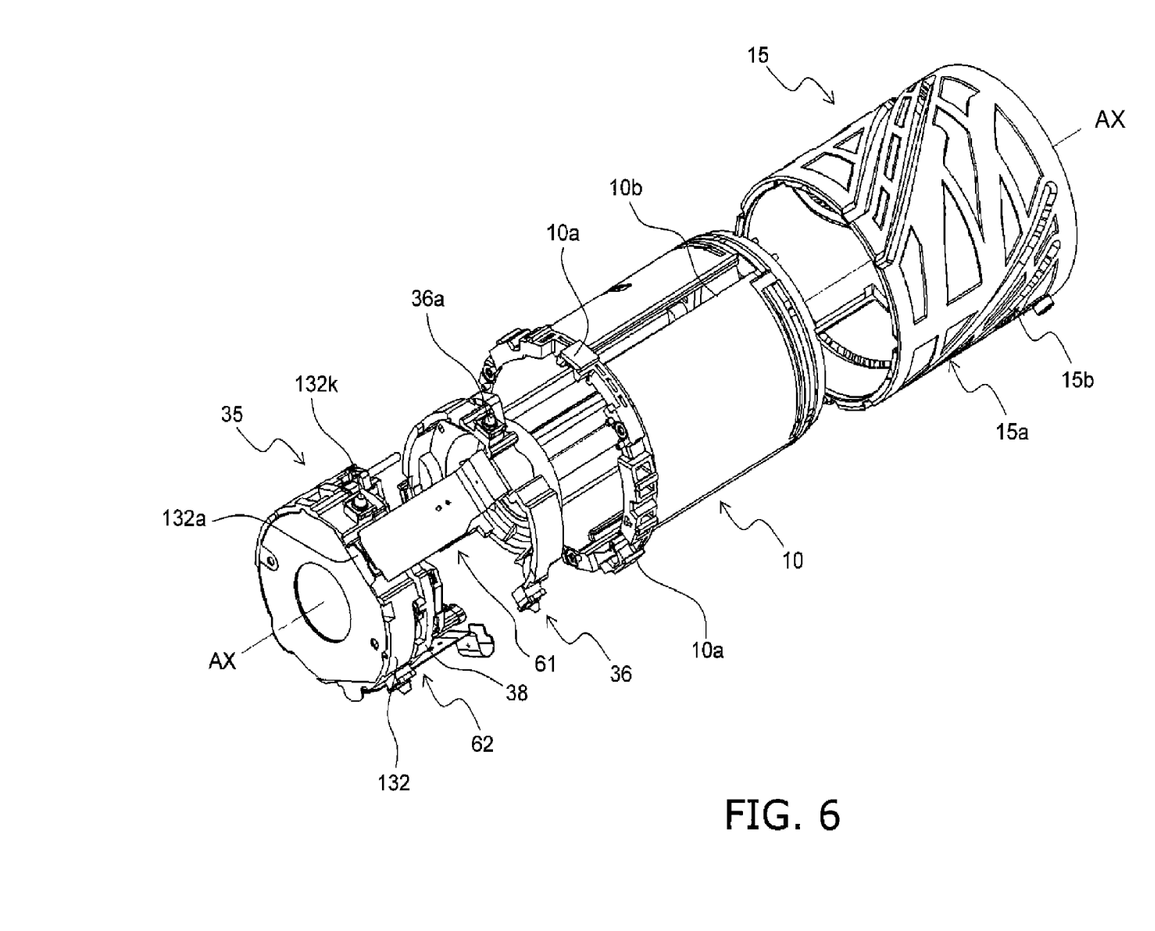
FIG. 6 is an exploded oblique view of a lens frame assembly, a first lens holder to which a rectilinear fixing frame is mounted, and a cam frame.

As shown in FIG. 6, rectilinear protrusions 10a that protrude outward from the outer peripheral portion are formed on the rectilinear fixing frame 10. More precisely, three rectilinear protrusions 10a are formed on the front outer peripheral portion of the rectilinear fixing frame 10. The three rectilinear protrusions 10a are disposed spaced apart in the peripheral direction.

Also, the rectilinear fixing frame 10 is configured such that the sixth lens frame 36 and the lens frame assembly 35 are able to move in the optical axis direction. A rectilinear through-groove 10b that passes through in the radial direction is formed in the rectilinear fixing frame 10. The rectilinear through-groove 10b guides the sixth lens frame 36 and the lens frame assembly 35 in the optical axis direction. The second lens frame 31 is mounted at the front end of the rectilinear fixing frame 10 in the optical axis direction (see FIGS. 3 and 4).

Figure 7:
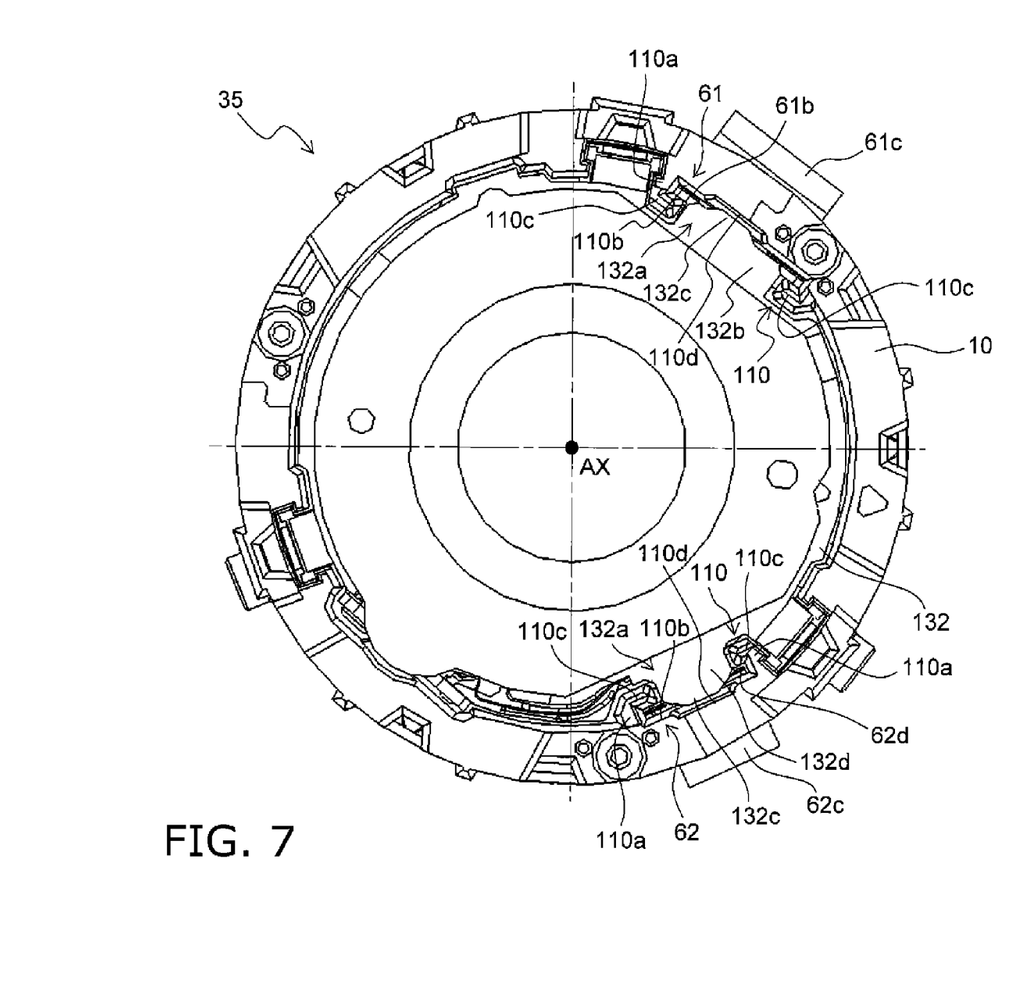
FIG. 7 is a front view of the lens frame assembly pertaining to this embodiment when it has been mounted to the rectilinear fixing frame.

As shown in FIGS. 4, 5, and 7, the rectilinear fixing frame 10 includes guide grooves 110. The guide grooves 110 are formed in the inner peripheral portion of the rectilinear fixing frame 10. The guide grooves 110 guide flexible printed circuit boards 61 and 62 (discussed below) (the flexible printed circuit board 61 is used for OIS (optical image stabilization) and the flexible printed circuit board 62 is used for a motor). More precisely, two guide grooves 110 are formed in the inner peripheral portion of the rectilinear fixing frame 10. The two guide grooves 110 each extend from the front end in the optical axis direction toward the rear end in the optical axis direction. Also, the two guide grooves 110 guide the OIS-use flexible printed circuit board 61 and the motor-use flexible printed circuit board 62, respectively. The shape of the guide grooves 110 will be described in detail below.

As shown in FIGS. 4 to 6, the cam frame 15 is formed in a cylindrical shape. First cam grooves 15a and second cam grooves 15b are formed in the outer peripheral portion of the cam frame 15. First cam protrusions (discussed below) of the first lens holder 20 engage with the first cam grooves 15a. Second cam protrusions (discussed below) of the first lens holder 20 are disposed in the second cam grooves 15b of the cam frame 15. When the first cam protrusions are engaged with the first cam grooves 15a, the rotation of the cam frame 15 causes the first lens holder 20 to move back and forth. The second cam grooves 15b are also reinforcing grooves. Since the second cam protrusions are disposed in the second cam grooves 15b, if the camera should be dropped, etc., and an external force exerted on the lens barrel 2, the second cam protrusions abuts the second cam grooves 15b. This diminishes the external force exerted on the first cam protrusions. The cam frame 15 is linked to the zoom ring 40 via a linking member (not shown). Specifically, the cam frame 15 is able to rotate integrally with the zoom ring 40.

The first lens holder 20 is formed in a cylindrical shape. The first cam protrusions (not shown) that engage with the first cam grooves 15a of the cam frame 15, and the second cam protrusions (not shown) that engage with the second cam grooves 15b of the cam frame 15 are formed in the inner peripheral portion of the first lens holder 20. Also, rectilinear grooves 20b that engage with the rectilinear protrusions 10a of the rectilinear fixing frame 10 are formed in the inner peripheral portion of the first lens holder 20 (see FIG. 5). The rectilinear grooves 20b of the first lens holder 20 guide the rectilinear fixing frame 10 in the optical axis direction. The first lens holder 20 also supports the first lens frame 30. The first lens frame 30 supports a first lens L1 (see FIGS. 4 and 5).

As shown in FIGS. 3 to 6, the second lens frame 31 supports a second lens L2. Protrusions 31a that protrude outward from the outer peripheral portion are formed on the second lens frame 31. More precisely, three protrusions 31a are formed on the outer peripheral portion of the second lens frame 31. The three protrusions 31a are disposed spaced apart in the peripheral direction. The three protrusions 31a are mounted to the end of the rectilinear fixing frame 10 via linking members such as screws (not shown), which mounts the second lens frame 31 to the rectilinear fixing frame 10.

As shown in FIGS. 3 to 6, the lens frame assembly 35 includes a third lens frame 32, an OIS aperture unit 38 that supports a fourth lens frame 33, a fifth lens frame 34, and a motor unit 39. The lens frame assembly 35 also includes the flexible printed circuit boards 61 and 62. These flexible printed circuit boards include the OIS-use flexible printed circuit board 61 and the motor-use flexible printed circuit board 62. Here, the OIS-use flexible printed circuit board 61 and the motor-use flexible printed circuit board 62 are disposed separately. More specifically, the OIS-use flexible printed circuit board 61 and the motor-use flexible printed circuit board 62 are disposed spaced apart by a specific distance around the optical axis AX. The reason for thus disposing the OIS-use flexible printed circuit board 61 and the motor-use flexible printed circuit board 62 separately is to avoid cross talk.

The lens frame assembly 35 is housed in the rectilinear fixing frame 10 by being inserted into the rectilinear fixing frame 10 from the front side in the optical axis direction toward the rear side in the optical axis direction.

As shown in FIGS. 4 and 5, the third lens frame 32 includes a third-A lens frame 132 and a third-B lens frame 232. The third-A lens frame 132 supports a third-A lens L31.

Figure 8:
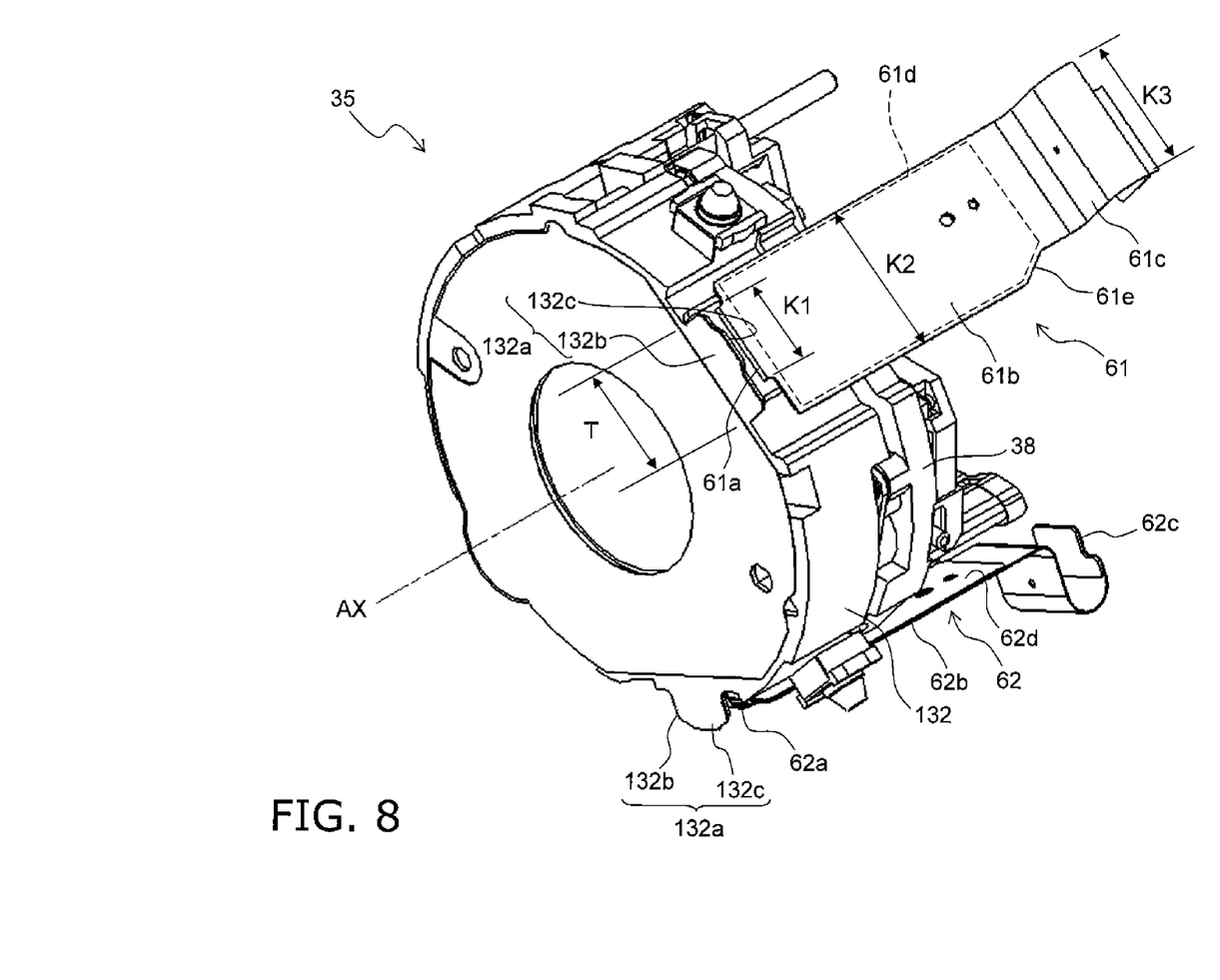
FIG. 8 is an external oblique view of the lens frame assembly pertaining to this embodiment.

As shown in FIGS. 6 to 8, the third-A lens frame 132 includes convex portions 132a provided to the outer peripheral portion. More precisely, the third-A lens frame 132 includes two convex portions 132a provided to the outer peripheral portion. The two convex portions 132a are disposed spaced apart by a specific distance in the peripheral direction. At least part of the convex portions 132a is disposed in the guide grooves 110 of the rectilinear fixing frame 10. The convex portions 132a are disposed on the front side in the optical axis direction with respect to the flexible printed circuit boards 61 and 62 (see FIGS. 4 and 5). As shown in FIGS. 7 and 8, the convex portions 132a have first distal end portions 132b and second distal end portions 132c that are provided to the first distal end portions 132b. Three cam pins 132k are mounted on the third-A lens frame 132 (see FIG. 6).

As shown in FIGS. 4 and 5, the third-B lens frame 232 supports a third-B lens L32. The third-B lens frame 232 is mounted to the third-A lens frame 132.

The OIS aperture unit 38 includes an optical shake correcting mechanism and an aperture mechanism. The fourth lens frame 33 is mounted to the OIS aperture unit 38. The fourth lens frame 33 supports a fourth lens L4. The fourth lens L4 is used for OIS.

The fifth lens frame 34 supports a fifth lens L5. The fifth lens L5 is used for focusing. The fifth lens frame 34 is mounted to the third-A lens frame 132.

The motor unit 39 is mounted to the third-A lens frame 132. The motor-use flexible printed circuit board 62 is mounted to the motor unit 39. The motor-use flexible printed circuit board 62 is disposed in one of the two guide grooves 110 provided to the rectilinear fixing frame 10.

As shown in FIG. 6, the sixth lens frame 36 supports a sixth lens L6. The sixth lens L6 is used for zooming. Three cam pins 36a are mounted to the outer peripheral portion of the sixth lens frame 36. The three cam pins 36a are disposed spaced apart in the peripheral direction.

As shown in FIGS. 3 to 5, the seventh lens frame 37 supports a seventh lens L7. The seventh lens frame 37 is mounted to the rear end of the ring mount base 45.

As shown in FIGS. 7 and 8, the OIS-use flexible printed circuit board 61 is used to control mechanisms related to OIS. The OIS-use flexible printed circuit board 61 is mounted to the OIS aperture unit 38. Also, the OIS-use flexible printed circuit board 61 is disposed in the other of the two guide grooves 110 provided to the rectilinear fixing frame 10 (see FIGS. 4, 5, and 7).

The motor-use flexible printed circuit board 62 is mounted to the motor unit 39. The motor-use flexible printed circuit board 62 is used to control a motor. Also, the motor-use flexible printed circuit board 62 is disposed in the guide groove 110 of the rectilinear fixing frame 10.

As shown in FIGS. 3 to 5, a lens control board 50 is used to control the various lenses. The lens control board 50 is mounted to the rear face of the ring mount base 45. The OIS-use flexible printed circuit board 61 and the motor-use flexible printed circuit board 62 are linked to the lens control board 50.

As shown in FIGS. 3 to 5, the zoom ring 40 is used to control the zoom mechanism. When the zoom ring 40 rotates, the sixth lens frame 36 (including the sixth lens L6) and the third lens frame 32 move back and forth via the cam frame 15.

The focus ring 41 is used to control the focus mechanism. When the focus ring 41 rotates, a motor or the like (not shown) is driven to move the fifth lens frame 34 (including the fifth lens L5) back and forth.

As shown in FIGS. 4 and 5, the ring mount base 45 is used to support the zoom ring 40 and the focus ring 41. The zoom ring 40 and the focus ring 41 are rotatably mounted to the outer peripheral portion of the ring mount base 45.

The rectilinear fixing frame 10 is an example of a support frame. The OIS aperture unit 38 and the third-A lens frame 132 to which the motor unit 39 is mounted are examples of moving units.

1-2. Configuration of Flexible Printed Circuit Boards and Rectilinear Fixing Frame Guide Grooves 1-2-1. Configuration of Flexible Printed Circuit Boards The configuration of the flexible printed circuit boards (the OIS-use flexible printed circuit board 61 and the motor-use flexible printed circuit board 62) will now be described.

As shown in FIGS. 4 to 6 and FIG. 8, the OIS-use flexible printed circuit board 61 includes a base end portion 61a, a wide portion 61b, and a terminal portion 61c. The base end portion 61a is mounted to the OIS aperture unit 38. The base end portion 61a is disposed in a curved state between the OIS aperture unit 38 and the guide grooves 110 of the rectilinear fixing frame 10. In FIGS. 4 and 5, S1 is the curved portion of the base end portion 61a. The wide portion 61b is a portion that extends from the base end portion 61a, and is formed wider than the base end portion 61a. The wide portion 61b is disposed in the guide groove 110 of the rectilinear fixing frame 10. The terminal portion 61c is a portion that extends from the wide portion 61b, and is linked to the lens control board 50.

As shown in FIG. 8, the motor-use flexible printed circuit board 62 includes substantially the same configuration as the OIS-use flexible printed circuit board 61. For example, the base end portion 62a, wide portion 62b, and terminal portion 62c of the motor-use flexible printed circuit board 62 are substantially the same as the base end portion 61a, wide portion 61b, and terminal portion 61c of the OIS-use flexible printed circuit board 61. Accordingly, these portions will not be described again. In other words, those portions whose description is omitted in the description of the motor-use flexible printed circuit board 62 are configured the same as in the OIS-use flexible printed circuit board 61.

As shown in FIG. 8, auxiliary boards 61d and 62d are mounted to the OIS-use flexible printed circuit board 61 and the motor-use flexible printed circuit board 62. More precisely, the auxiliary board 61d is formed in substantially the same shape as the wide portion 61b. The auxiliary board 61d is mounted to the wide portion 61b. The auxiliary board 61d helps guide the flexible printed circuit board 61 in the guide groove 110 of the rectilinear fixing frame 10. The auxiliary board 62d is formed in substantially the same shape as the wide portion 62b. The auxiliary board 62d is mounted to the wide portion 62b. The auxiliary board 62d helps guide the flexible printed circuit board 62 in the guide groove 110 of the rectilinear fixing frame 10.

1-2-2. Configuration of Rectilinear Fixing Frame Guide Grooves

The configuration of the guide grooves 110 of the rectilinear fixing frame 10 will now be described.

As discussed above, the two guide grooves 110 are formed in the rectilinear fixing frame 10. The OIS-use flexible printed circuit board 61 is disposed in one of the two guide grooves 110, while the motor-use flexible printed circuit board 62 is disposed in the other.

The flexible printed circuit boards 61 and 62 disposed in the two guide grooves 110 are of different types, but the configuration of the two guide grooves 110 is the same. Accordingly, the configuration of the two guide grooves 110 will be described below using the single term "guide grooves."

Figure 9:
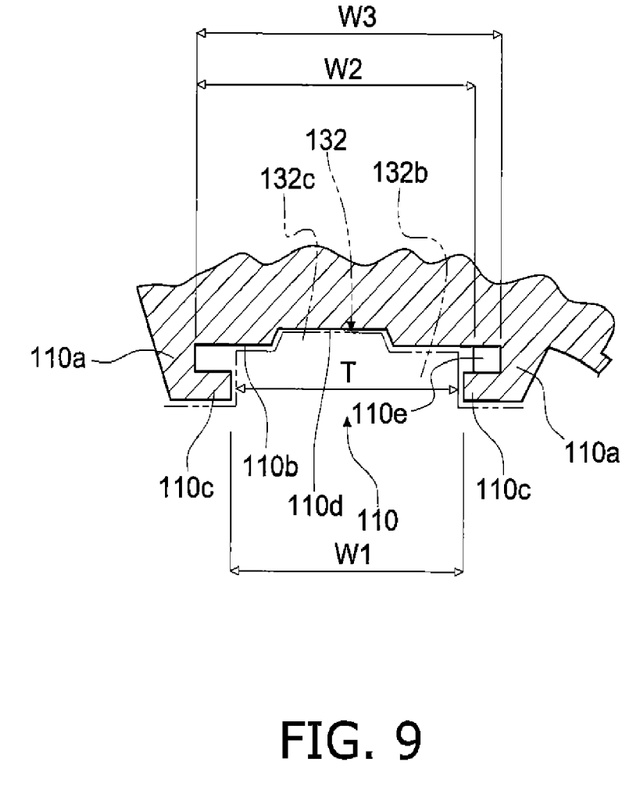
FIG. 9 is a cross section of the guide groove of the rectilinear fixing frame pertaining to this embodiment.

As shown in FIGS. 7 and 9, the guide grooves 110 have a pair of mutually opposite wall portions 110a and a bottom portion 110b. A protrusion 110c is formed on each of the wall portions 110a. Concave portions 110d in which the second distal end portions 132c of the convex portions 132a (discussed below) are disposed are formed in the bottom portion 110b.

As shown in FIGS. 8 and 9, the protrusions 110c are formed on the wall portions 110a so that the spacing W1 of the pair of protrusions 110c will be greater than the width K1 of the base end portions 61a and base end portion 62a of the flexible printed circuit boards 61 and 62. Also, the protrusions 110c are formed on the wall portions 110a so that the spacing W1 of the pair of protrusions 110c will be less than the width K3 of the terminal portions 61c and 62c of the flexible printed circuit boards 61 and 62. Also, the protrusions 110c are formed on the wall portions 110a so that the spacing W1 of the pair of protrusions 110c will be greater than the width T of the convex portions 132a. The width T of the convex portions 132a here corresponds to the width of the first distal end portions 132b.

Also, the wall portions 110a and restriction portions 110e (discussed below) are formed so that the spacing W2 between the wall portions 110a and the restriction portions 110e will be greater than the width K3 of the terminal portions 61c and 62c of the flexible printed circuit boards 61 and 62. Also, the wall portions 110a and the restriction portions 110e are formed so that the spacing W2 between the wall portions 110a and the restriction portions 110e will be less than the width K2 of the wide portions 61b and 62b. Furthermore, the wall portions 110a are formed so that the spacing W3 of the pair of wall portions 110a will be greater than the width K2 of the wide portions 61b and 62b.

The spacings W1, W2, and W3 and the widths K1, K2, and K3 described here can be compiled into the inequality K1<W1<K3<W2<K2<W3.

The wide portions 61a and 61b of the flexible printed circuit boards 61 and 62 are disposed between the bottom portion 110b and the pair of protrusions 110c. The restriction portions 110e are formed in the guide grooves 110. More precisely, the restriction portions 110e are formed protruding from the wall portions 110a at the rear end side of the guide grooves 110 extending in the optical axis direction. The restriction portions 110e restrict the movement of the wide portion 61b from the front side in the optical axis direction (an example of one side in the optical axis direction) to the rear side in the optical axis direction (an example of the other side in the optical axis direction). The wide portion 61b on the terminal portion 61c side abuts the restriction portions 110e. In FIG. 8, the wide portion 61b on the terminal portion 61c side is labeled as 61e.

2. Assembly Method 2-1. Lens Barrel Assembly Method

The method for assembling the lens barrel will now be described.

First, the sixth lens frame 36 is inserted from the front in the optical axis direction into the inner peripheral side of the rectilinear fixing frame 10. The cam pins 36a provided to the outer peripheral portion of the sixth lens frame 36 here are inserted into the rectilinear through-groove 10b of the rectilinear fixing frame 10.

Next, the lens frame assembly 35 is inserted from the front in the optical axis direction into the inner peripheral side of the rectilinear fixing frame 10. The cam pins 132k provided to the outer peripheral portion of the lens frame assembly 35 (including the third-A lens frame 132) are inserted into the rectilinear through-groove 10b of the rectilinear fixing frame 10. The second lens frame 31 is then mounted to the front end portion of the rectilinear fixing frame 10 from the front in the optical axis direction. The protrusions 31a of the second lens frame 31 are disposed at the front end portion of the rectilinear fixing frame 10 via linking members such as screws (not shown). This mounts the sixth lens frame 36, the lens frame assembly 35, and the second lens frame 31 to the rectilinear fixing frame 10.

Next, this rectilinear fixing frame 10 is inserted into the inner peripheral side of the first lens holder 20 from the rear in the optical axis direction. The rectilinear protrusions 10a of the rectilinear fixing frame 10 are engaged with the rectilinear grooves 20b in the inner peripheral portion of the first lens holder 20. Also, first cam protrusions (not shown) on the inner peripheral portion of the first lens holder 20 are engaged with the first cam grooves 15a in the outer peripheral portion of the cam frame 15. Second cam protrusions (not shown) on the inner peripheral portion of the first lens holder 20 are engaged with the second cam grooves 15b in the outer peripheral portion of the cam frame 15.

Then, this first lens holder 20 is inserted into the inner peripheral side of the ring mount base 45. The focus ring 41 and the zoom ring 40 are also rotatably mounted on the outer peripheral portion of this ring mount base 45. The seventh lens frame 37 is mounted to the rear end portion of the ring mount base 45. The lens control board 50 is further mounted to the rear end portion of this ring mount base 45.

This is how the lens barrel is assembled. The method for assembling the lens barrel given here was mainly focusing on the frames constituting the lens barrel as the basic elements. Therefore, the other members constituting the lens barrel will not be described.

2-2. Method for Assembling Flexible Printed Circuit Boards

The method for assembling the flexible printed circuit boards 61 and 62 will now be described.

In the above section "2-1. Lens Barrel Assembly Method," when the lens frame assembly 35 is inserted into the rectilinear fixing frame 10 from the front side in the optical axis direction toward the rear side in the optical axis direction, the flexible printed circuit boards (the OIS-use flexible printed circuit board 61 and the motor-use flexible printed circuit board 62) are guided by the guide grooves 110 of the rectilinear fixing frame 10.

More specifically, first the terminal portions 61c and 62c of the flexible printed circuit boards 61 and 62 are inserted into the guide grooves 110 of the rectilinear fixing frame 10 from the front side of the rectilinear fixing frame 10 in the optical axis direction. Then, the wide portions 61b and 62b to which the auxiliary boards 61d and 62d have been mounted are inserted into the guide grooves 110 of the rectilinear fixing frame 10.

Next, the main body portion of the lens frame assembly 35 (everything but the flexible printed circuit boards 61 and 62) is disposed on the front side of the rectilinear fixing frame 10 in the optical axis direction. More specifically, the convex portions 132a formed on the third-A lens frame 132 are disposed in the guide grooves 110. Even more specifically, the first distal end portions 132b of the convex portions 132a formed on the third-A lens frame 132 are passed between the pair of protrusions 110c in the guide grooves 110, and disposed opposite the bottom portion 110b of the guide grooves 110. The second distal end portions 132c of the convex portions 132a formed on the third-A lens frame 132 are then disposed in the concave portions 110d formed in the bottom portion 110b of the guide grooves 110. In this state, the convex portions 132a are disposed on the front side in the optical axis direction with respect to the flexible printed circuit boards 61 and 62.

Then, the main body portion of the lens frame assembly 35 is inserted into the interior of the rectilinear fixing frame 10 from the front side of the rectilinear fixing frame 10 in the optical axis direction. Thereupon, the convex portions 132a of the third-A lens frame 132 abut the flexible printed circuit boards 61 and 62. More specifically, the first distal end portions 132b or second distal end portions 132c of the convex portions 132a hit the wide portions 61b and 62b of the flexible printed circuit boards 61 and 62, that is, the wide portions 61b and 62b to which the auxiliary boards 61d and 62d have been mounted. Thus, when the convex portions 132a of the third-A lens frame 132 hits the flexible printed circuit boards 61 and 62, the flexible printed circuit boards 61 and 62 are pushed into the guide grooves 110. More precisely, the wide portions 61b and 62b and the terminal portions 61c and 62c of the flexible printed circuit boards 61 and 62 are guided by the guide grooves 110 in a state in which the base end portions 61a and 62a of the flexible printed circuit boards 61 and 62 are curved between the main body portion of the lens frame assembly 35 and the guide grooves 110.

Then, when the main body portion of the lens frame assembly 35 is inserted further into the rectilinear fixing frame 10, the terminal portions 61c and 62c of the flexible printed circuit boards 61 and 62 protrude from the rear end portion of the rectilinear fixing frame 10. The wide portions 61b and 62b of the flexible printed circuit boards 61 and 62 (the portion 61e in FIG. 8) then hit the restriction portions 110e of the guide grooves 110. This positions the flexible printed circuit boards 61 and 62 with respect to the rectilinear fixing frame 10. Also, the terminal portions 61c and 62c of the flexible printed circuit boards 61 and 62 are fixed to the ring mount base 45, which positions the flexible printed circuit boards 61 and 62 with respect to the ring mount base 45 (not shown).

Here, the second distal end portions 132c are disposed in the concave portions 110d, and the first distal end portions 132b are disposed on the front side of the flexible printed circuit boards 61 and 62 in the optical axis direction. Accordingly, even if the flexible printed circuit boards 61 and 62 disposed in the guide grooves 110 ride up over the first distal end portions 132b and try to come out in the optical axis direction, this will be restricted by the second distal end portions 132c.

3. Conclusion

Since the flexible printed circuit boards of a conventional lens barrel are freely deformable, it is difficult to pass the flexible printed circuit boards through from the front to rear.

The above embodiment was conceived in order to solve this problem. Specifically, with the lens barrel 2 in this embodiment, the flexible printed circuit boards 61 and 62 can be easily mounted to the rectilinear fixing frame 10.

(1) In this embodiment, the OIS aperture unit 38 and the third-A lens frame 132 (an example of a moving unit) to which the motor unit 39 is mounted constitute the rectilinear fixing frame 10 (an example of a support frame) so as to allow movement in the optical axis direction. Also, the OIS aperture unit 38 and the third-A lens frame 132 support the flexible printed circuit boards 61 and 62. Therefore, when the OIS aperture unit 38 and the third-A lens frame 132 move in the optical axis direction, the flexible printed circuit boards 61 and 62 also move similarly in the optical axis direction. Also, when the OIS aperture unit 38 and the third-A lens frame 132 move in the optical axis direction, the convex portions 132a of the third-A lens frame 132 move in the optical axis direction along the guide grooves 110 of the rectilinear fixing frame 10. Consequently, the flexible printed circuit boards 61 and 62 are guided in the guide grooves 110 by the convex portions 132a of the third-A lens frame 132.

Thus, with this technology, the flexible printed circuit boards 61 and 62 can be easily guided along the guide grooves 110 by the convex portions 132a of the third-A lens frame 132.

(2) With a conventional lens barrel, the flange of the rectilinear fixing frame 10 must be formed at the front end so that the first lens holder can be moved as far forward as possible in a configuration in which the flange is formed integrally with the main body of the rectilinear fixing frame 10. In this case, since the flange is formed at the front end of a rectilinear fixing frame, the cam frame has to be assembled from the rear of the rectilinear fixing frame. When the cam frame is assembled from the rear of the rectilinear fixing frame, no reinforcing member or component (such as a flange) for ensuring adequate strength of the rear end portion of the rectilinear fixing frame can be provided to the outer peripheral portion at the rear end of the rectilinear fixing frame, and the outer peripheral portion at the rear end of the rectilinear fixing frame cannot be linked.

Meanwhile, since the rectilinear fixing frame is the main member constituting the lens barrel, ensuring adequate strength of the rectilinear fixing frame is very important. Accordingly, providing a reinforcing member or component (such as a flange) on the inner peripheral side at the rear end of the rectilinear fixing frame is an effective way to ensure adequate strength of the rectilinear fixing frame, such as the strength of the rear end portion of the rectilinear fixing frame.

When this configuration is employed, since the flexible printed circuit boards, etc., are connected to the lens control board, etc., at the rear end portion of the rectilinear fixing frame, they can be inserted from the front and passed to the rear while avoiding a reinforcing member or component at the rear end portion of the rectilinear fixing frame.

However, since a flexible printed circuit board is freely deformable, as mentioned above, it is difficult to pass a flexible printed circuit board from front to rear while avoiding a reinforcing member or component at the rear end portion of the rectilinear fixing frame.

In this embodiment, when the OIS aperture unit 38 and the third-A lens frame 132 are inserted from the front side in the optical axis direction to the rear side in the optical axis direction, the convex portions 132a of the third-A lens frame 132 move from the front side in the optical axis direction to the rear side in the optical axis direction, along the guide grooves 110 of the rectilinear fixing frame 10. Then the flexible printed circuit boards 61 and 62 are moved by the convex portions 132a from the front side in the optical axis direction to the rear side in the optical axis direction. The flexible printed circuit boards 61 and 62 are then connected to the lens control board 50 disposed on the rear side in the optical axis direction.

Thus, with this technology, the flexible printed circuit boards 61 and 62 can be easily guided from the front side in the optical axis direction to the rear side in the optical axis direction by the convex portions 132a of the third-A lens frame 132. Consequently, the flexible printed circuit boards 61 and 62 can be easily connected to the lens control board 50 disposed on the other side in the optical axis direction.

The convex portions 132a of the third-A lens frame 132 are disposed on the front side of the flexible printed circuit boards 61 and 62 (the front side in the optical axis direction). Consequently, even if the user should look into the interior of the lens barrel 2 from the front side of the lens barrel 2, for example, the convex portions 132a will hide the flexible printed circuit boards 61 and 62. Specifically, the flexible printed circuit boards 61 and 62 can be hidden without the use of any special parts. Thus, the number of parts required can be reduced with this technology.

(3) In this embodiment, since the auxiliary boards 61d and 62d are mounted to the flexible printed circuit boards 61 and 62, the flexible printed circuit boards 61 and 62 can be guided along the guide grooves 110 more reliably.

(4) In this embodiment, the flexible printed circuit boards 61 and 62 have the base end portions 61a and 62a, the wide portions 61b and 62b, and the terminal portions 61c and 62c. In this case, since the wide portion 61b and 62b is disposed between the bottom portion 110b of the guide grooves 110 and the pair of protrusions 110c, the flexible printed circuit boards 61 and 62 can be disposed more reliably in the interior of the guide grooves 110. Also, since the width of the base end portion 61a and 62a is less than the spacing of the protrusions 110c, the base end portion 61a can move freely between the protrusions 110c. Specifically, the OIS aperture unit 38 and the third-A lens frame 132 can be easily moved in the optical axis direction.

(5) In this embodiment, since the width of the convex portions 132a of the third-A lens frame 132 is less than the spacing of the protrusions 110c, the convex portions 132a can be easily moved along the guide grooves 110. Specifically, the flexible printed circuit boards 61 and 62 can be easily moved along the guide grooves 110 by the convex portions 132a of the third-A lens frame 132.

(6) In this embodiment, the wide portion 61b on the terminal portion 61c side of the flexible printed circuit boards 61 and 62 hits the restriction portions 110e, which allows the flexible printed circuit boards 61 and 62 to be positioned reliably.

(7) In this embodiment, the base end portion 61a, which is narrower in width than the wide portion 61b, is disposed in a curved state between the guide grooves 110 and the OIS aperture unit 38 and third-A lens frame 132, so the OIS aperture unit 38 and the third-A lens frame 132 can be easily moved in the optical axis direction.

(8) In this embodiment, the convex portions 132a of the third-A lens frame 132 have the first distal end portions 132b and the second distal end portions 132c that are provided to the first distal end portions 132b. Also, the second distal end portions 132c are disposed in the concave portions 110d formed in the bottom portion 110b of the guide grooves 110. Thus disposing the second distal end portions 132c in the concave portions 110d of the guide grooves 110 keeps the flexible printed circuit boards 61 and 62 disposed in the guide grooves 110 from riding up over the convex portions 132a and coming out in the optical axis direction.

OTHER EMBODIMENTS

Embodiment 1 was described above as an example of the technology disclosed herein. Nevertheless, the technology disclosed herein is not limited to this, and can also be applied to embodiments with modifications, substitutions, additions, omissions, and so forth made as needed. Also, the various constituent elements described in the above embodiment can be combined to create new embodiments.

(A) In Embodiment 1 above, an example was given in which the pair of protrusions 110c was formed in the guide grooves 110 of the rectilinear fixing frame 10, but the configuration of the guide grooves 110 is not limited to that in the above embodiment, and any configuration may be used. For example, the guide grooves 110 may be made up of a bottom portion 110b and a pair of wall portions 110a.

Since the base end portion 61a of the OIS-use flexible printed circuit board 61 is disposed in a curved state between the guide grooves 110 and the OIS aperture unit 38, the wide portion 61b and terminal portion 61c of the flexible printed circuit board is biased by the base end portion 61a from the OIS aperture unit 38 toward the bottom portion 110b of the guide grooves 110. Similarly, since the base end portion 61a of the motor-use flexible printed circuit board 62 is disposed in a curved state between the guide grooves 110 and the third-A lens frame 132, the wide portion 61b and terminal portion 61c of the flexible printed circuit boards 61 and 62 are biased by the base end portion 61a from the third-A lens frame 132 toward the bottom portion 110b of the guide grooves 110.

Thus, in this case, although the pair of protrusions 110c is not formed in the guide grooves 110, the flexible printed circuit boards 61 and 62 can still be reliably disposed in the guide grooves 110. Also, the same effect as described above can be obtained.

(B) In Embodiment 1 above, an example was given in which the second distal end portions 132c of the convex portions 132a was disposed in the concave portions 110d of the guide grooves 110, but as long as the first distal end portions 132b of the convex portions, the second distal end portions 132c and concave portions 110d do not necessarily have to be provided.

OTHER DESCRIPTION

An embodiment was described above as an example of the technology disclosed herein, and for this purpose, the appended drawings and a detailed description have been provided.

Therefore, the constituent elements shown in the appended drawings and discussed in the detailed description may include not only the constituent elements that are essential to solving the problem, but also constituent elements that are not essential to solving the problem and are included in order to illustrate this technology. Accordingly, the fact that constituent elements that are not essential are shown in the appended drawings or discussed in the detailed description should not be construed to mean that these non-essential constituent elements are in fact essential.

Also, since the above embodiment was given to illustrate the technology disclosed herein, so various modifications, substitutions, additions, omissions, and so forth can be made within the scope of the patent claims or equivalents thereof.

GENERAL INTERPRETATION OF TERMS

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of the lens barrel. Accordingly, these terms, as utilized to describe the present technology should be interpreted relative to the lens barrel.

The term "configured" as used herein to describe a component, section, or part of a device implies the existence of other unclaimed or unmentioned components, sections, members or parts of the device to carry out a desired function.

The terms of degree such as "substantially", "about" and "approximately" as used herein mean a reasonable amount of deviation of the modified term such that the end result is not significantly changed.

While only selected embodiments have been chosen to illustrate the present technology, it will be apparent to those skilled in the art from this disclosure that various changes and modifications can be made herein without departing from the scope of the technology as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further technologies by the applicant, including the structural and/or functional concepts embodied by such feature(s). Thus, the foregoing descriptions of the embodiments according to the present technologies are provided for illustration only, and not for the purpose of limiting the technology as defined by the appended claims and their equivalents.

INDUSTRIAL APPLICABILITY

This disclosure can be applied to lens barrels to which a flexible printed circuit board can be mounted.

What is claimed is:

1. A lens barrel, comprising:
a flexible printed circuit board;
a moving unit configured to support the flexible printed circuit board; and
a support frame configured to allow the moving unit to move in an optical axis direction, and house the moving unit, wherein:
the support frame includes a guide groove for guiding the flexible printed circuit board,
the moving unit includes a convex portion provided at an outer peripheral portion, and
at least part of the convex portion is disposed in the guide groove of the support frame.

2. The lens barrel according to claim 1, further comprising:
a control board, wherein:
the convex portion of the moving unit is disposed on one side of the flexible printed circuit board in the optical axis direction,
the moving unit is housed in the support frame by being inserted from one side in the optical axis direction to the other side in the optical axis direction,
the control board is disposed on the other side in the optical axis direction, and
the flexible printed circuit board is connected to the control board.

3. The lens barrel according to claim 1, wherein:
an auxiliary board for assisting in the guiding of the flexible printed circuit board in the guide groove of the support frame is mounted on the flexible printed circuit board.

4. The lens barrel according to claim 3, wherein:
the flexible printed circuit board includes a base end portion, a wide portion, and a terminal portion, the base end portion mounted on the moving unit, the wide portion extending from the base end portion and being wider than the base end portion, and the terminal portion extending from the wide portion,
the guide groove of the support frame includes a bottom portion and a pair of wall portions that are arranged opposite to one another,
a protrusion is formed on each of the two wall portions,
the wide portion is disposed between the bottom portion and the pair of protrusions, and
the width of the base end portion is less than a spacing of the pair of protrusions.

5. The lens barrel according to claim 4, wherein:
the width of at least part of the convex portion is less than the spacing of the pair of protrusions.

6. The lens barrel according to claim 3, wherein:
the flexible printed circuit board includes a base end portion, a wide portion, and a terminal portion, the base end portion mounted on the moving unit, the wide portion extending from the base end portion and being wider than the base end portion, and the terminal portion extending from the wide portion,
the wide portion is disposed in the guide groove of the support frame,
a restriction portion is formed in the guide groove of the support frame, the restriction portion configured to restrict a movement of the wide portion from one side in the optical axis direction to the other side in the optical axis direction, and
the wide portion on the terminal portion side abuts the restriction portion.

7. The lens barrel according to claim 4, wherein:
the base end portion is disposed between the guide groove of the support frame and the moving unit in a curved state.

8. The lens barrel according to claim 1, wherein:
at least part of the convex portion includes a first distal end portion and a second distal end portion provided to the first distal end portion, and
a concave portion in which the second distal end portion is disposed is formed in a bottom portion of the guide groove of the support frame.

* * * * *